US012542235B2

(12) United States Patent
Sahu et al.

(10) Patent No.: US 12,542,235 B2
(45) Date of Patent: Feb. 3, 2026

(54) WINDING, A TRANSFORMER AND A TRANSFORMER ARRANGEMENT

(71) Applicant: Hitachi Energy Ltd, Zürich (CH)

(72) Inventors: Kiran Chandra Sahu, Västerås (SE); Anders Daneryd, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/995,405

(22) PCT Filed: Aug. 3, 2023

(86) PCT No.: PCT/EP2023/071508
§ 371 (c)(1),
(2) Date: Jan. 16, 2025

(87) PCT Pub. No.: WO2024/033208
PCT Pub. Date: Feb. 15, 2024

(65) Prior Publication Data
US 2025/0259784 A1 Aug. 14, 2025

(30) Foreign Application Priority Data
Aug. 12, 2022 (EP) .................................... 22190287

(51) Int. Cl.
*H01F 27/33* (2006.01)
*H01F 27/32* (2006.01)

(52) U.S. Cl.
CPC ......... *H01F 27/323* (2013.01); *H01F 27/321* (2013.01); *H01F 27/33* (2013.01)

(58) Field of Classification Search
CPC ....... H01F 27/323; H01F 27/321; H01F 27/33
(Continued)

(56) References Cited

U.S. PATENT DOCUMENTS 2,384,799 A * 9/1945 Cook .................... H01F 27/343 336/190
3,815,068 A 6/1974 Kashima et al.
(Continued)

FOREIGN PATENT DOCUMENTS

CN 1244286 A 2/2000
CN 103348423 A 10/2013
(Continued)

OTHER PUBLICATIONS

International Search and Written Opinion of the International Searching Authority, International Application No. PCT/EP2023/071508, mailed Oct. 24, 2023, 12 pages.
(Continued)

*Primary Examiner* — Tuyen T Nguyen
(74) *Attorney, Agent, or Firm* — Sage Patent Group

(57) ABSTRACT

The disclosure relates to a winding for a phase winding of a transformer. The winding includes a plurality of winding portions arranged along a coil axis. The plurality of winding portions include a first winding portion arranged at a first end of the winding and a second winding portion arranged at a second end of the winding. The winding further includes at least a third winding portion arranged along the coil axis between the first winding portion and the second winding portion. The first winding portion and the second winding portion have a first winding portion stiffness as seen along the coil axis and the at least third winding portion has a second winding portion stiffness as seen along said coil axis. The second winding portion stiffness is greater than the first winding portion stiffness. The third portion has a third portion center point on the coil axis, equidistantly spaced at a distance from the first winding portion and from the second winding portion, which third portion center point is located
(Continued)

closer to the first end of the winding than the winding center point.

12 Claims, 7 Drawing Sheets

(58) Field of Classification Search
USPC ..................... 336/55–62, 180–182, 199, 207
See application file for complete search history.

(56) References Cited

U.S. PATENT DOCUMENTS

| | | | | |
|---|---|---|---|---|
| 11,881,349 | B2 * | 1/2024 | Sahu | H01F 27/006 |
| 12,080,474 | B1 * | 9/2024 | Sahu | H01F 30/12 |
| 2011/0227683 | A1 | 9/2011 | Eriksson et al. | |

FOREIGN PATENT DOCUMENTS

| | | | |
|---|---|---|---|
| CN | 112585704 | A | 3/2021 |
| JP | H04318905 | A | 11/1992 |
| JP | 2013183151 | A | 9/2013 |

OTHER PUBLICATIONS

International Preliminary Report on Patentability, International Application No. PCT/EP2023/071508, mailed Jun. 28, 2024, 8 pages.
Chinese Office Action, Chinese Patent Application No. 202380058842.X, mailed May 16, 2025, 7 pages.
Chinese Notice of Allowance and English Translation, Korean Patent Application No. 202380058842.X, mailed Dec. 5, 2025, 6 pages.

* cited by examiner

WINDING, A TRANSFORMER AND A TRANSFORMER ARRANGEMENT

CROSS REFERENCE TO RELATED APPLICATIONS

This application is a 35 U.S.C. § 371 national stage application of PCT International Application No. PCT/EP2023/071508 filed on Aug. 3, 2023, which in turn claims priority to European Patent Application No. 22190287.7, filed on Aug. 12, 2022, the disclosures and content of which are incorporated by reference herein in their entireties.

TECHNICAL FIELD

The present disclosure relates to a winding for a transformer. The disclosure also relates to a transformer comprising such a winding, and to a transformer arrangement comprising such a transformer.

BACKGROUND

Transformers, as any other industrial products, must comply with various requirements on noise levels. Load noise is produced by electromagnetic forces in the windings of transformers. Transformers vibrate at 100 Hz or 120 Hz mechanical frequency due to electric operating frequencies at 50 Hz or 60 Hz, respectively. Asymmetric, and especially symmetric vibration modes, contribute to the generation of noise. Symmetric vibrations cause a piston-like movement of the windings, which in turn is transmitted via pressplates, support frame and transformer oil to the walls of a transformer tank, generating significant noise.

JPH04318905 A discloses a winding device having spacers made of pressboard and a central portion of the winding has spacers of a larger compressive elastic modulus, such as fiber board or a resin.

U.S. Pat. No. 3,815,068 A shows a winding having thicker spacers located in the axial middle portion of a low-voltage winding. The thicker spacers give the winding larger gaps between the coil turns, resulting on a reduced number of turns in the middle portion.

JP2013183151 A discloses that a mode shape of the winding may be changed by changing the material and thickness of spacers.

SUMMARY

Therefore, an object of the disclosure is to provide an improved winding for a transformer. More specifically, an object of the disclosure is to provide a winding having reduced noise emissions and which is cost-effective to build and assemble. Another object of the disclosure is to provide a transformer comprising such a winding and a transformer arrangement comprising such a transformer in a transformer tank.

According to a first aspect of the disclosure the object is at least partly achieved by a winding according to claim 1.

Hence, there is provided a winding for a phase winding of a transformer, said winding having coil turns around a coil axis. The winding has a first end and a second end and a winding center point on the coil axis between the first end and the second end. The winding comprises a plurality of winding portions arranged along the coil axis. The plurality of winding portions comprise a first winding portion arranged at the first end of the winding and a second winding portion arranged at the second end of the winding. The winding further comprises at least a third winding portion arranged along the coil axis between the first winding portion and the second winding portion. The first winding portion and the second winding portion have a first winding portion stiffness as seen along said coil axis, and the at least third winding portion has a second winding portion stiffness as seen along said coil axis. The second winding portion stiffness is greater than the first winding portion stiffness. The third portion has a third portion center point on the coil axis, equidistantly spaced at a distance from the first winding portion and from the second winding portion. The third portion center point is located closer to the first end of the winding than the winding center point.

The winding is a winding for a phase winding of a transformer. A phase winding may have a plurality of windings. For instance, a three-phase transformer has three phase windings, each of which has at least two windings, e.g., an inner winding and an outer winding wherein "inner" and "outer" refer to relative positions of the windings around the coil axis. A single-phase transformer has only one phase winding.

A winding portion is herein defined as a portion of the winding along the coil axis. The coil axis is a vertical axis when the winding is assembled with a phase winding of a transformer. The first winding portion and the second winding portion sandwich the third winding portion between them. Conventional windings only have a single winding portion.

It has been discovered that a middle part of the winding, wherein "middle" refers to a position along the coil axis, expands and contracts significantly more than other parts of the winding due to symmetric vibrations at the operating frequency. Therefore, arranging a third winding portion having a greater stiffness in the middle part of the winding reduces/dampens the movement of the winding and thereby reduces noise emissions.

A distance between the third portion center point and the first end of the winding is shorter than a distance between the winding center point and the first end of the winding.

It has been observed that the largest movements of the winding arise closer to the first end than to the second end, i.e., not exactly at the winding center point. It is therefore advantageous to make the winding stiffer in a portion closer to the first end than in the axial center of the winding. Accordingly, the third winding portion, which is stiffer than the first winding portion and the second winding portion, is arranged closer to the first end than to the second end. It follows that an extension along the coil axis of the first winding portion may be shorter than an extension along the coil axis of the second winding portion.

Optionally, the winding is provided with a plurality of spacers between the coil turns, wherein the first winding portion and the second winding portion is provided with at least one first type of spacers having at least one first modulus of elasticity and the third winding portion is provided with at least one second type of spacers having at least one second modulus of elasticity, and wherein each of the at least one second modulus of elasticity is greater than the first modulus of elasticity.

Spacers are used to keep the coil turns of the windings separated to avoid short-circuiting the coil turns. The elasticity/stiffness of the spacers affect the elasticity/stiffness of the winding. The stiffness of a winding portion may thus be adapted and configured using spacers of different kinds. According to the present disclosure, a stiffer kind of spacer, having a significantly greater modulus of elasticity, is arranged between the coil turns of the third winding portion, as compared to the spacers of the first winding portion and of the second winding portion. Thereby, the second winding portion stiffness is greater than the first winding portion stiffness.

Optionally, the third winding portion comprises a plurality of sub-portions arranged along the coil axis. Each sub-portion having a sub-portion stiffness as seen along the coil axis. Each sub-portion comprises one second type of spacers and each sub-portion stiffness is greater than the first winding portion stiffness.

The second type of spacers are thus characterized in that they are all of greater stiffness than the first type of spacers. The second type of spacers may comprise different spacers, such that each sub-portion has spacers of a particular stiffness (modulus of elasticity). The second type of spacers may for instance comprise two kinds of spacers. Thereby, the third winding portion may have two different kinds of sub-portions which are arranged along the coil axis, for instance in an alternating configuration.

Optionally, a distribution of the plurality of sub-portions forms an aggregate winding portion stiffness, wherein the plurality of sub-portions is configured such that the aggregate winding portion stiffness of the third winding portion located on a first side of the winding center point as seen along the coil axis is greater than an aggregate winding portion stiffness of the third winding portion located on a second side of the winding center point as seen along the coil axis.

An aggregate winding portion stiffness is to be understood as a collection of sub-portions stiffnesses that provide a winding portion with a stiffness that may vary along the axial extent of the winding portion. Since each sub-portion stiffness is stiffer than the at least first winding portion stiffness and the at least second winding portion stiffness, it is ensured that the third winding portion is stiffer than the first winding portion and the second winding portion along the whole axial extent of the third winding portion.

The stiffness of the third winding portion along the coil axis may thus be configured by arranging the sub-portions in a pre-determined manner. By arranging one or more sub-portions having a greater stiffness on the first side of the winding center point and arranging one or more sub-portions having a lower stiffness on the second side of the winding center point, it is ensured that the third winding portion is stiffer closer to the first end than to the second end. Thereby, the large movements of the winding may be dampened more efficiently.

Optionally, the first side of the winding center point is located closer to the first end than to the second end of the winding.

It should be understood the first side of the center point is the side closer the first end of the winding and the second side of the center point is the side closer the second end of the winding.

Optionally, the modulus of elasticity of the first type of spacers may be 0.1 GPa-3 GPa, preferably 0.5 GPa-1.5 GPa, and most preferably 0.9 GPa-1.1 GPa. The modulus of elasticity of the at least one second type of spacers may be more than 50 GPa, preferably more than 80 GPa, and most preferably more than 105 GPa. Further, a material of the first type of spacers may be a cellulose-based material such as pressboard and a material of the at least one second type of spacers may be a composite material such as steatite.

Conventional spacers are usually made of pressboard which has a modulus of elasticity of around 1 GPa. It can be seen that the stiffnesses (moduli of elasticity) suggested for the second type of spacers is much higher than the first type of spacers. Steatite, which has a modulus of elasticity of around 110 GPa, has been shown to have a particularly large damping effect on the noise generation.

Optionally, the first end is an upper end of the winding when installed in a transformer and the second end is a lower end of the winding when installed in a transformer.

Thus, the largest movements of the vibrating winding occur somewhat closer to the upper end of the winding than to the lower end.

Optionally, the first end is a lower end of the winding when installed in a transformer and the second end is an upper end of the winding when installed in a transformer.

Thus, the largest movements of the vibrating winding occur somewhat closer to the lower end of the winding than to the upper end.

It is foreseen that the largest movements of the vibrating winding occur offset from the center of the winding towards the upper end or towards the lower end of the winding. The offset depends on the construction of a transformer in which the winding is comprised.

According to a second aspect of the present disclosure, the object is at least partly achieved by a transformer according to claim 11.

Thus, there is provided a transformer comprising at least one winding according to any one of the embodiments of the first aspect of the present disclosure.

Optionally, the transformer comprises at least one phase winding which has a winding according to any one of the embodiments of the first aspect of the present disclosure.

When the transformer comprises at least one winding according to the present disclosure, the acoustic power of each such winding may reduce the acoustic power of the transformer as a whole, such as when at least one winding of three phase windings is in accordance with the present disclosure. The winding according to the present disclosure may thus be an inner or outer winding of the phase winding. Expressed differently, the winding according to the present disclosure may be a high voltage winding or a low voltage winding of the phase winding.

According to a third aspect of the present disclosure, the object is at least partly achieved by a transformer arrangement according to claim 12.

Thus, there is provided a transformer arrangement comprising a transformer according to any one of the embodiments of the second aspect of the present disclosure. The transformer may be immersed in an electrically insulating medium inside a transformer tank.

The transformer may be immersed in an electrically insulating medium, such as oil, in the transformer tank. By the provision of at least one winding according to the disclosure, the symmetric mode of the transformer may be modified to reduce vibration and noise of the transformer. Consequently, such a transformer in a transformer tank will cause the transformer tank walls to generate less noise to the surroundings.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
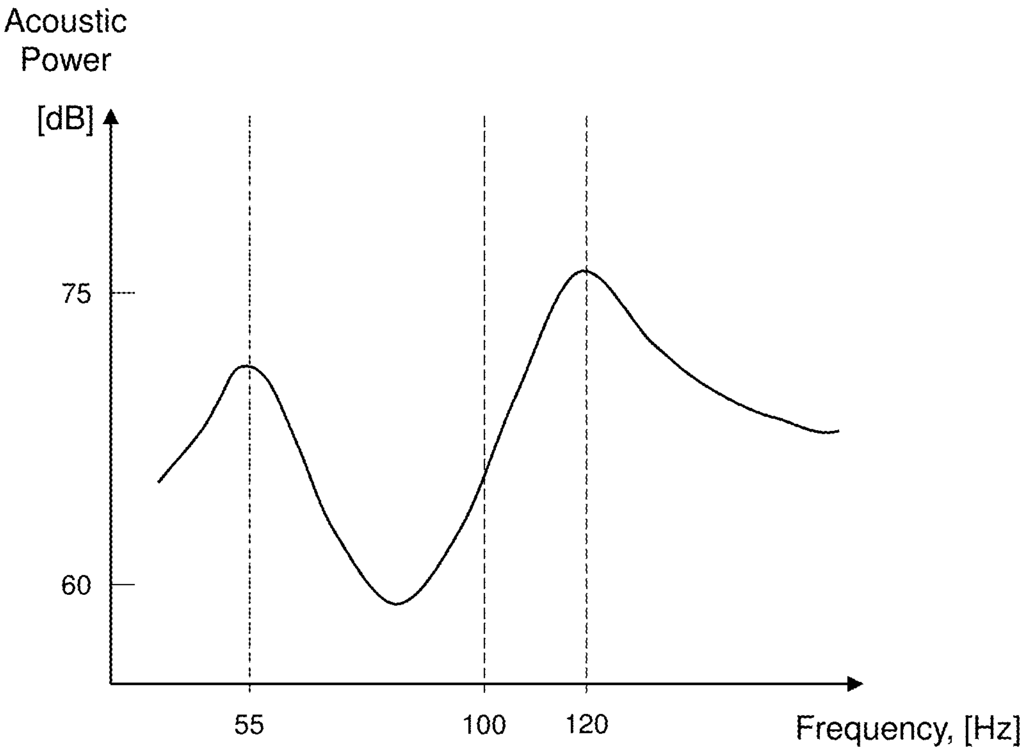
Fig. 1 (prior art)
FIG. 1 shows the noise power generated by a prior art transformer at predetermined frequencies
Figure 3:
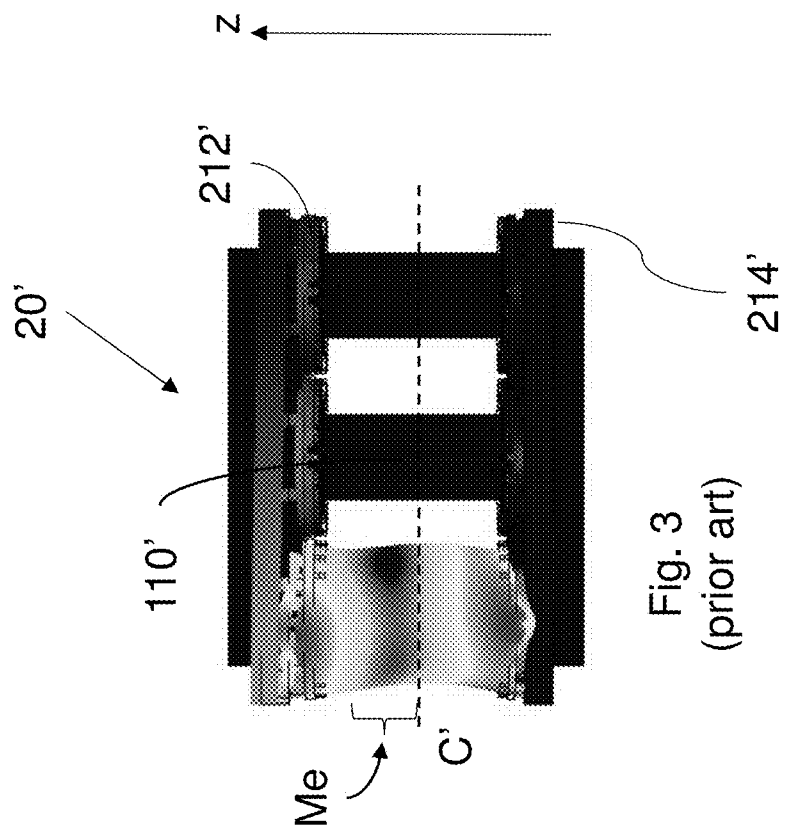
Fig. 3 (prior art)
FIG. 3 shows a prior art phase winding under maximum expansion.
Figure 2:
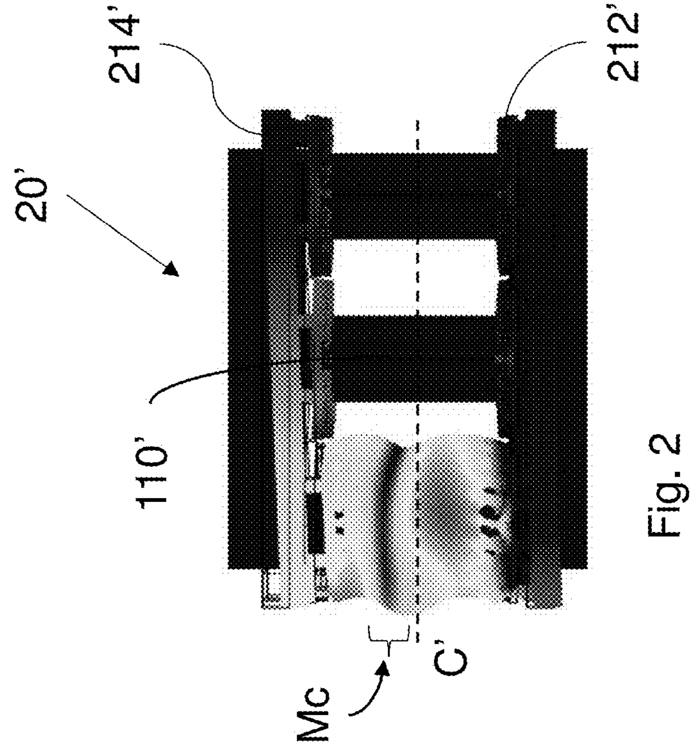
Fig. 2 (prior art)
FIG. 2 shows a prior art phase winding under maximum compression.

FIG. 1 shows how acoustic power of a prior art transformer 20', shown in FIGS. 2 and 3, as a result of vibrations of windings 110', varies with frequency. The horizontal axis displays the mechanical vibration frequency. The curve represents a superposition of vibration modes of the structure of the transformer 20' because of vibrations of the windings 110'. The modes of interest of the transformer 20' may be identified at the peak amplitudes, where the acoustic power is largest. The peak amplitude at around 120 Hz shows a symmetric vibration mode. It can be seen that it has a great influence on the acoustic power at 100 Hz and 120 Hz, i.e., at the operating electric frequencies of 50 Hz and 60 Hz, respectively.

Symmetric movements (piston-like displacements) of the transformer 20' (FIGS. 2 and 3), especially when installed in a transformer tank (not shown), radiate significant noise to the far field as compared to asymmetric movement because symmetric vibrations displace more air outside the transformer tank and thereby radiate sound more efficiently than asymmetric movements. Windings 110' (see FIGS. 2 and 3) under load usually vibrate at 100 Hz or 120 Hz mechanical main frequency (i.e., usually 50 Hz or 60 Hz predetermined electrical operating (excitation) frequency multiplied by two).

FIGS. 2 and 3 show simulated movement in an operating prior art transformer 20' having three phase windings, each comprising windings 110' having pressboard spacers between the coil turns. Only movement in one of the phase windings is shown for the sake of clarity. In normal operation all three phase windings would move similarly but with a phase difference between the oscillations. The phase windings are clamped between upper and lower pressplates 212' and upper and lower support beams 214'. When the winding 110' vibrates, the vibrational movement is transferred to the pressplates 212' and the support beams 214', as shown. If the transformer 20' is enclosed in a transformer tank and immersed in an insulating medium, the movements would be further transferred via the insulating medium to the transformer tank walls.

The piston-like movement of symmetric vibrations leads to an oscillating compression and expansion of the windings, especially along a coil axis z. FIG. 2 shows the moving phase winding under maximum compression Mc. FIG. 3 shows the moving phase winding under maximum expansion Me. The movement of the windings 110' varies along the coil axis, but FIGS. 2 and 3 show that both compression and expansion have a maximum slightly offset from a winding center point C'. It is an object of the present disclosure to reduce and dampen the movement of windings of a transformer.

Figure 4:
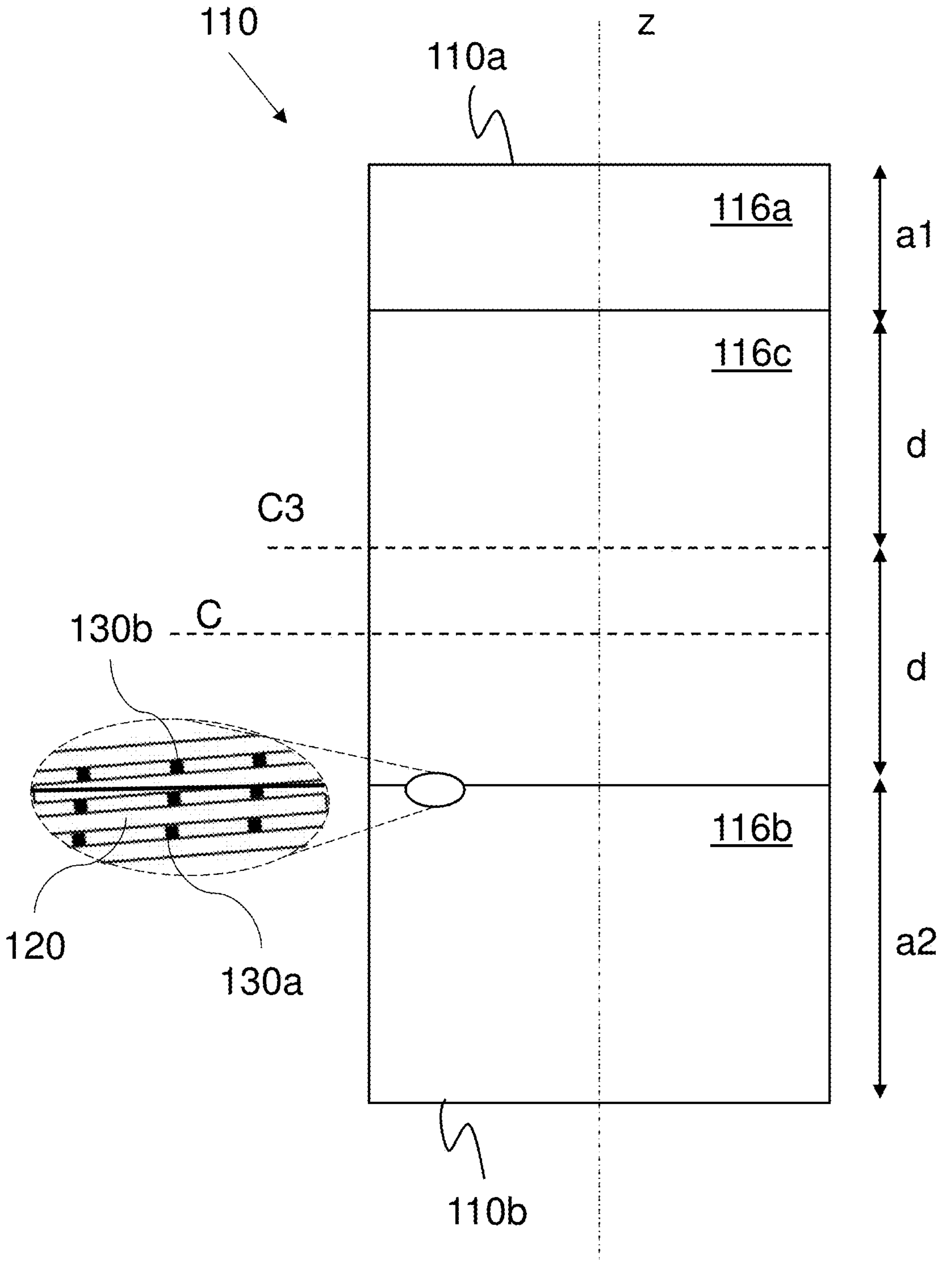
FIG. 4 shows a schematic representation of a winding according to an embodiment of the first aspect of the present disclosure.

FIG. 4 shows a winding 110 for a phase winding of a transformer 20 according to the first aspect of the present disclosure. The winding 110 has coil turns 120 around a coil axis z. The winding 110 further has a first end **110*a* and a second end 110*b* and a winding center point C on the coil axis z between the first end 110*a* and the second end 110*b***.

The winding 110 comprises a plurality of winding portions 116 arranged along the coil axis z. The plurality of winding portions 116 comprise a first winding portion **116*a* arranged at the first end 110*a* of the winding 110 and a second winding portion 116*b* arranged at the second end 110*b* of the winding 110. The winding 110 further comprises at least a third winding portion 116*c* arranged along the coil axis z between the first winding portion 116*a* and the second winding portion 116*b*. The first winding portion 116*a* and the second winding portion 116*b* have a first winding portion stiffness as seen along the coil axis z and the at least third winding portion 116*c*** has a second winding portion stiffness as seen along the coil axis z. The second winding portion stiffness is greater than the first winding portion stiffness.

The first winding portion **116*a* and the second winding portion 116*b* sandwich the third winding portion 116*c* between them. Conventional windings, such as illustrated in FIGS. 2 and 3**, only have a single winding portion.

Since it has been discovered that a middle part of the winding 110 expands and contracts significantly more than other parts of the winding 110 due to symmetric vibrations at the operating frequency, arranging the middle part of the winding 110 with a greater stiffness reduces/dampens the movement of the winding 110 and thereby reduces noise emissions. The greater stiffness of the middle part is achieved by the third winding portion **116*c* which has the second winding portion stiffness, which is greater than the first winding portion stiffness of the first winding portion 116*a* and the second winding portion 116*b***.

The third portion **116*c* has a third portion center point C3 on the coil axis z, equidistantly spaced at a distance d from the first winding portion 116*a* and from the second winding portion 116*b*. The third portion center point C3 may, as illustrated in FIG. 4, be located closer to the first end 110*a* of the winding 110 than the winding center point C. It is also conceivable that the winding center point C and the third portion center point C3 are the same, such as if the third winding portion 116*c* in located in the axial middle of the winding 110**.

Depending on the construction and design of a transformer and how phase windings are mounted and assembled with each other, the largest movements of the winding 110 may arise closer to the first end **110*a* than to the second end 110*b*, i.e., not exactly at the winding center point C. It is therefore advantageous to make the winding 110 stiffer in a portion closer to the first end 110*a* than in the axial center of the winding C. Accordingly, the third winding portion 116*c*, which is stiffer than the first winding portion 116*a* and the second winding portion 116*b*, is arranged closer to the first end 110*a* than to the second end 110*b*. It follows that an axial extension a1 of the first winding portion 116*a* may be shorter than an axial extension a2 of the second winding portion 116*b*, as exemplified in FIG. 4**.

It should herein be understood that the first end 110*a* may be an upper end of the winding 110 when installed in a transformer 100 and the second end 110*b* may be a lower end of the winding 110 when installed in a transformer 100, or vice versa. Thus, in operation, the largest movements of the vibrating winding 110 occur somewhat closer to the upper end 110*a* of the winding 110 than to the lower end 110*b*. Alternatively, the largest movements of the vibrating winding 110 may occur somewhat closer to the lower end 110*a* of the winding 110 than to the upper end 110*b*. The illustrated exemplary embodiments show the first end 110*a* as the upper end and the second end 110*b* as the lower end.

The winding 110 is provided with a plurality of spacers 130 between the coil turns 120. The first winding portion 116*a* and the second winding portion 116*b* are provided with at least one first type of spacers 130*a*, as exemplified by the detailed view in FIG. 4, having at least one first modulus of elasticity. The third winding portion 116*c* is provided with at least one second type of spacers 130*b* (not shown) having at least one second modulus of elasticity. Each of the at least one second modulus of elasticity is greater than the at least one first modulus of elasticity.

The spacers 130 are conventionally distributed along the axial length of the winding 110, between the coil turns 120, so as to separate and electrically insulate the coil turns 120 of the winding 110 from each other. The elasticity/stiffness of the spacers 130 affect the elasticity/stiffness of the winding 110. The stiffness of a winding portion 116 may thus be adapted and configured using spacers 130 of different kinds. According to the present disclosure, a stiffer second type of spacers 130*b*, having a greater modulus of elasticity, is arranged between the coil turns 120 of the third winding portion 116*c*, as compared to the first type of spacers 130*a* of the first winding portion 116*a* and of the second winding portion 116*b*. Thereby, the second winding portion stiffness is greater than the first winding portion stiffness.

Figure 5:
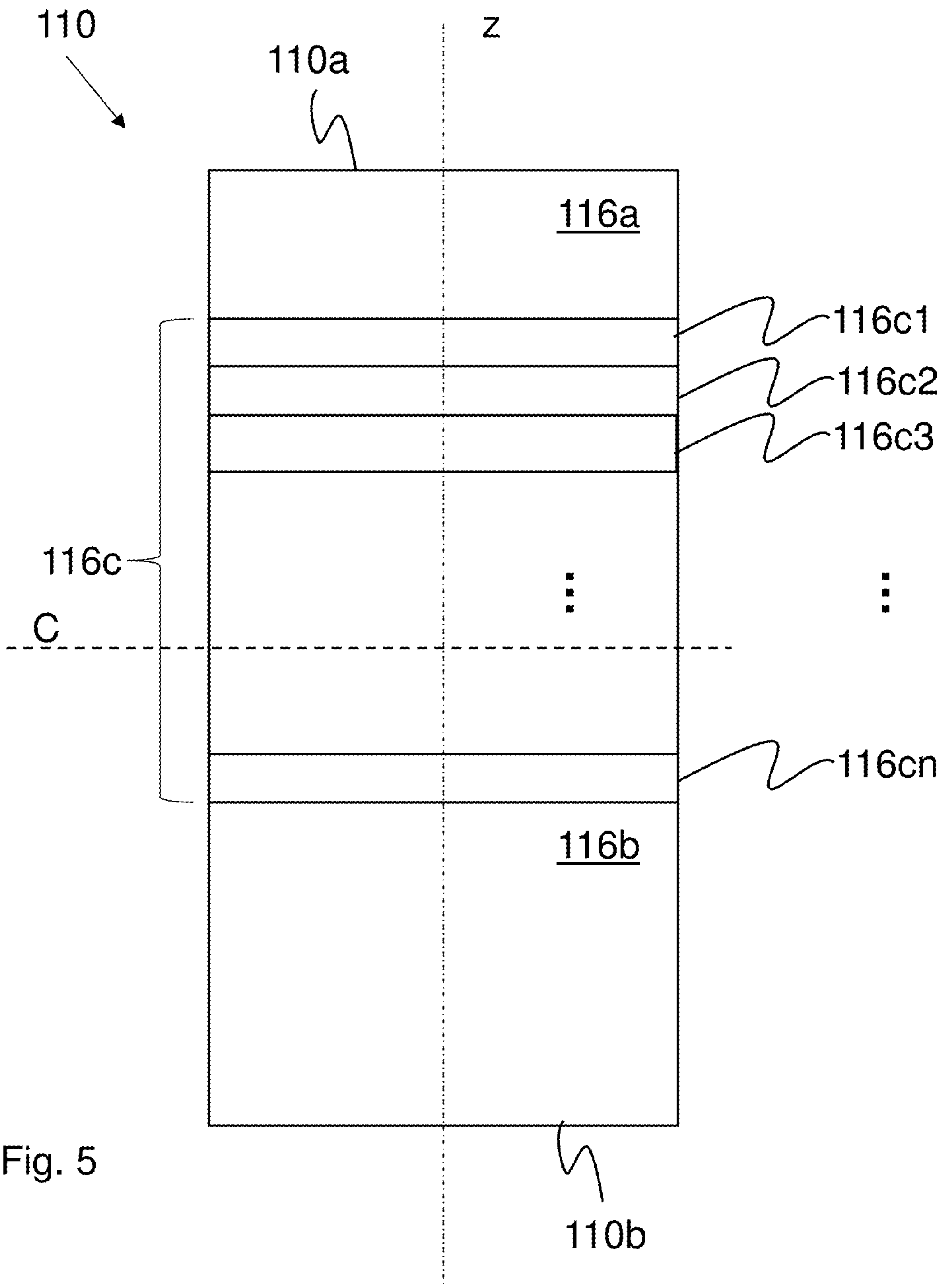
FIG. 5 shows a schematic representation of a winding according to an embodiment of the first aspect of the present disclosure.

In another embodiment, exemplified in FIG. 5, the third winding portion 116*c* comprises a plurality of sub-portions 116*c*1, . . . 116*cn* arranged along the coil axis z. Each sub-portion 116*c*1, . . . 116*cn* has a sub-portion stiffness as seen along the coil axis z, and Each sub-portion 116*c*1, . . . 116*cn* comprises one second type of spacers 130*b*. Each sub-portion stiffness is configured to be greater than the first winding portion stiffness.

The second type of spacers 130*b* are thus characterized in that they are all of greater stiffness than each of the at least one first type of spacers 130*a*. The second type of spacers 130*b* may comprise different spacers 130*b*, such that each sub-portion 116*c*1, . . . 116*cn* has spacers 130*b* of a respective stiffness (modulus of elasticity). The second type of spacers 130*b* may for instance comprise two kinds of spacers 130*b*. Thereby, the third winding portion 116*c* may for instance have two different kinds of sub-portions 116*c*1, 116*c*2 which are arranged along the coil axis, for instance arranging a plurality of a first sub-portion in an alternating configuration with a plurality of second sub-portions other. Using the example of two different sub-portions, it is also conceivable to arrange a first sub-portion 116*c*1 on a first side of the third portion center point C3 and to arrange a second sub-portion 116*c*2 on a second side of the third portion center point C3.

It is also conceivable to configure the first winding portion 116*a* and the second winding portion 116*b* with first sub-portions and second sub-portions, respectively (not shown). Each first sub-portion and each second sub-portion would then comprise one first type of spacers 130*a*. Each first and second sub-portion stiffness would be configured to be lesser than each of the sub-portion portion stiffnesses of the third winding portion 116*c*. Stiffer first sub-portions and second sub-portions would then be arranged closer to the third winding portion 116*c* than less stiff sub-portions and second sub-portions, such that the first winding portion 116*a* and the second winding portion 116*b* exhibit a higher stiffness near the third winding portion 116*c* than farther away from the third winding portion 116*c*.

A distribution of the plurality of sub-portions 116*c*1, . . . 116*cn* of the third winding portion 116*c* forms an aggregate winding portion stiffness of the third winding portion 116*c*. The plurality of sub-portions 116*c*1, . . . 116*cn* may be configured such that the aggregate winding portion stiffness of the third winding portion 116*c*, located on a first side of the winding center point C as seen along the coil axis z, is greater than an aggregate winding portion stiffness of the third winding portion 116*c* located on a second side of the winding center point C as seen along the coil axis z.

The aggregate stiffness of the third winding portion 116*c* along the coil axis may thus be configured by arranging the sub-portions 116*c*1, . . . 116*cn* in a pre-determined manner. By arranging one or more sub-portions 116*c*1, . . . 116*cn* having a greater stiffness on the first side of the winding center point C and arranging one or more sub-portions 116*c*1, . . . 116*cn* having a lower stiffness on the second side of the winding center point C it is ensured that the third winding portion 116*c* is stiffer closer to the first end 110*a* than to the second end 110*b*. Thereby, the large movements of the winding 110 may be dampened more efficiently.

It should herein be understood that the first side of the winding center point C is located closer to the first end 110*a* than to the second end 110*b* of the winding 110.

The spacers 130 may be selected such that the modulus of elasticity of the first type of spacers 130*a* is 0.1 GPa-3 GPa, preferably 0.5 GPa-1.5 GPa, and most preferably 0.9 GPa-1.1 GPa. The modulus of elasticity of the at least one second type of spacers 130*b* may be selected to be more than 50 GPa, preferably more than 80 GPa, and most preferably more than 105 GPa. In one example, the material of the first type of spacers 130*a* may be selected to be pressboard and a material of the at least one second type of spacers 130*b* may be selected to be steatite.

Conventional spacers 130 are usually made of pressboard which has a modulus of elasticity of around 1 GPa. It can be seen that the stiffnesses (moduli of elasticity) suggested for the second type of spacers 130*b* is much higher than the first type of spacers 130*a*. Steatite, which has a modulus of elasticity of around 110 GPa, has been shown to have a particularly large damping effect on the noise generation in combination with the first winding portion 116*a* and the second winding portion 116*b* being provided with conventional pressboard spacers.

Figure 6:
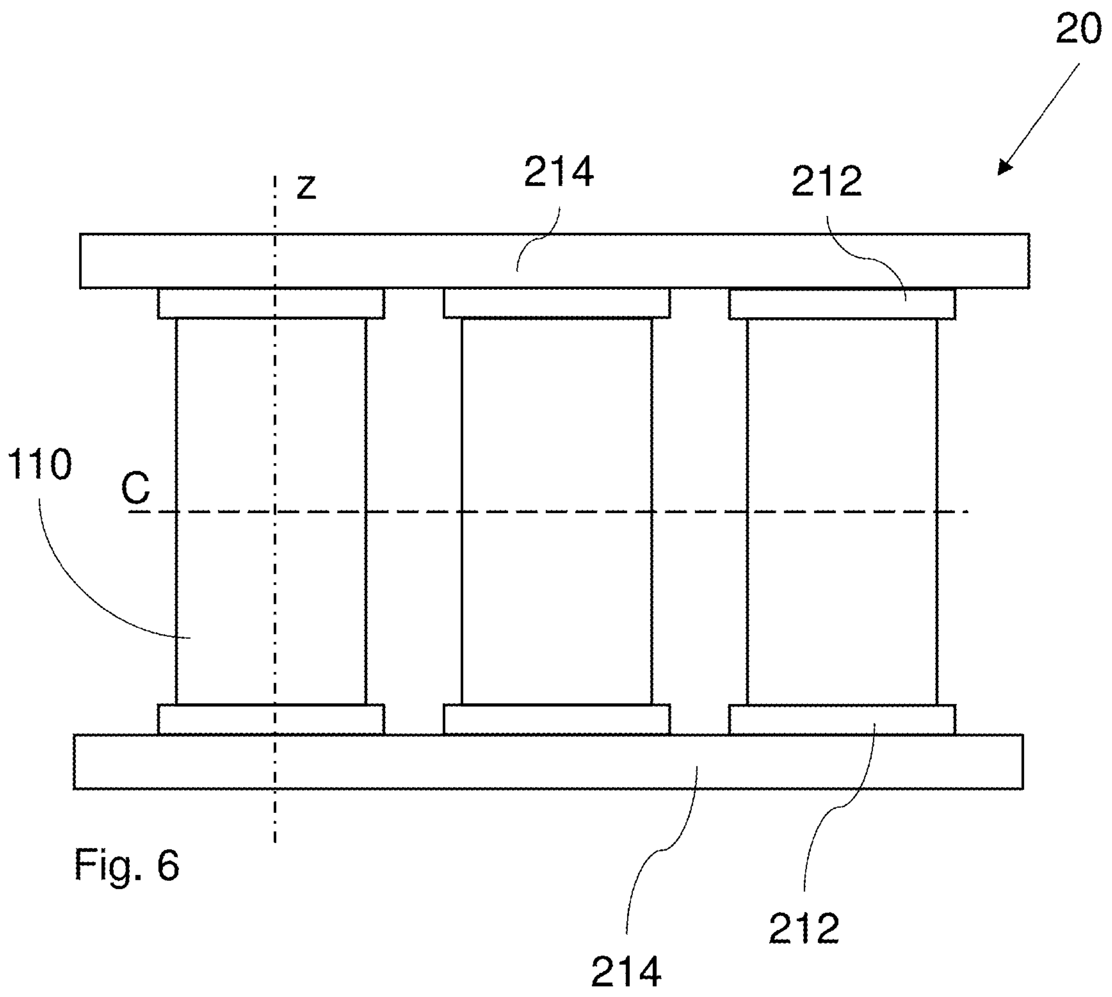
FIG. 6 shows a transformer according to the second aspect of the present disclosure.

FIG. 6 exemplifies a transformer 20 according to the second aspect of the present disclosure. The transformer 20 comprises at least one winding 110 according to any one of the embodiments of the first aspect of the present disclosure. The transformer 20 may further comprise upper and lower pressplates 212 and upper and lower support beams 214. The windings 110 are clamped between the support beams 214 and the pressplates 212. At least one winding 110 of the transformer 20 may be a winding 110 according to the first aspect of the present disclosure, as described herein above. The winding 110 may thus be an inner winding and/or an outer winding of a phase winding of the transformer 20.

Figure 7:
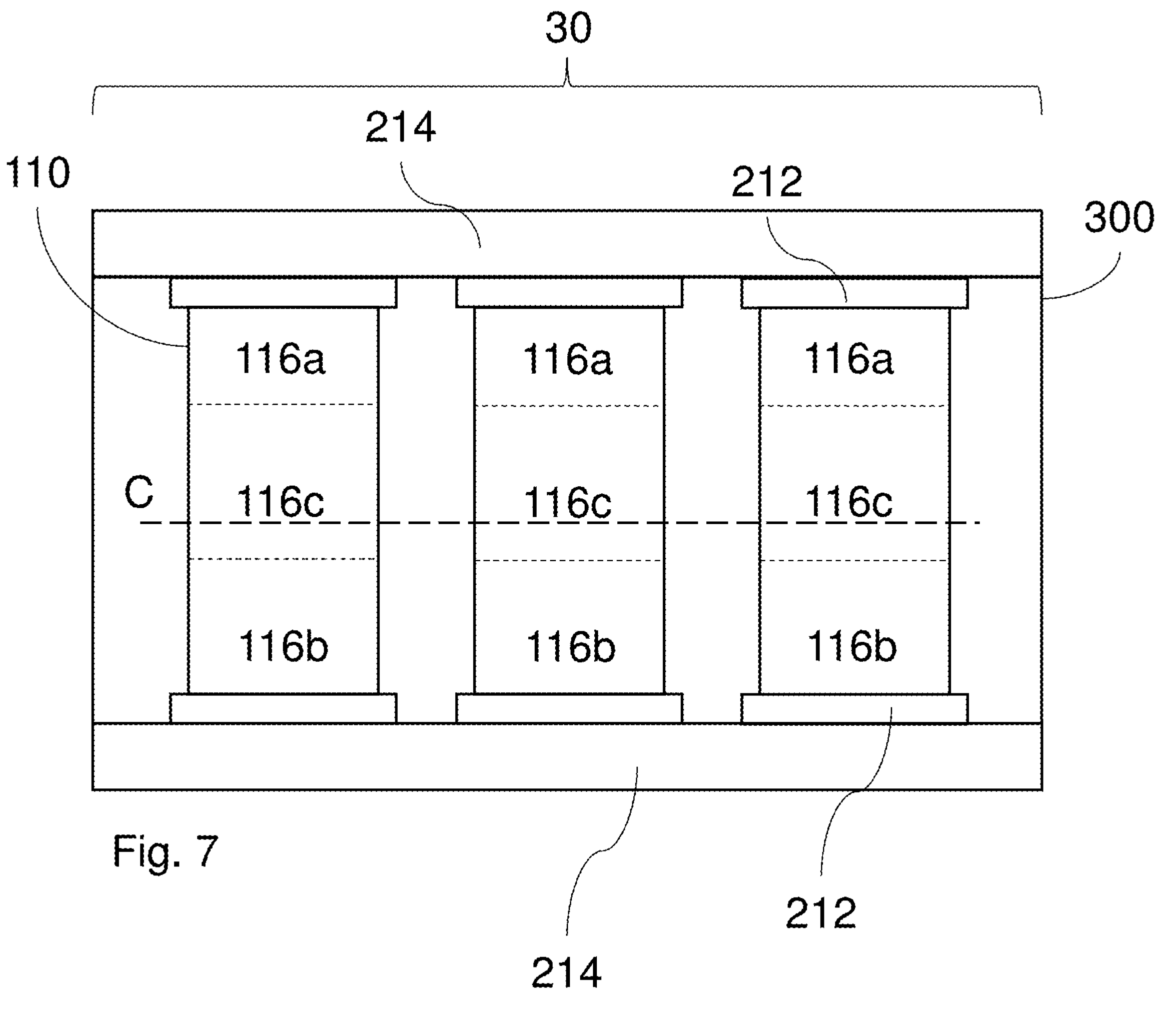
FIG. 7 shows a transformer arrangement according to the third aspect of the present disclosure.

FIG. 7 shows a transformer arrangement 30 according to the third aspect of the present disclosure. The transformer arrangement 30 comprises a transformer 20 according to any one of the embodiments of the second aspect of the present disclosure. The transformer may be immersed in an electrically insulating medium, such as oil, inside a transformer tank 300. By the provision of at least one winding 110 according to the disclosure, the symmetric mode of the transformer 20 may be modified to reduce vibration and noise of the transformer. Consequently, such a transformer 20 in a transformer tank 300 will cause the transformer tank walls to generate less noise to the surroundings.

Figure 8:
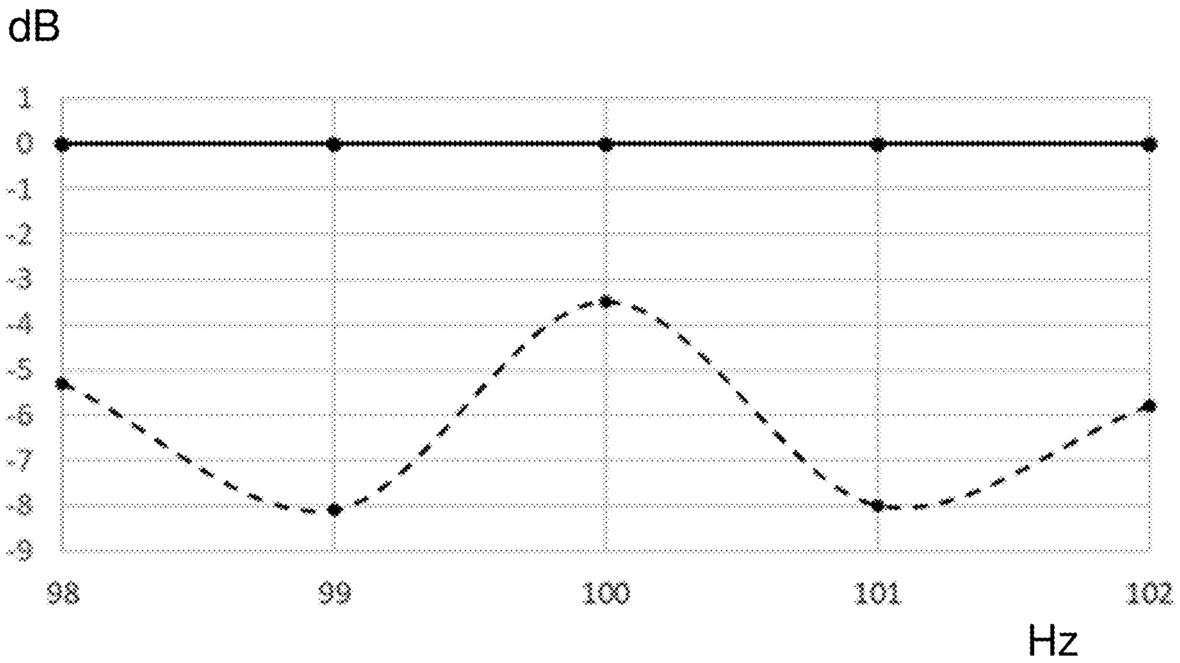
FIG. 8 shows a reduction in noise at various frequencies for a winding according to the first aspect of the present disclosure.

FIG. 8 shows a diagram of simulated results at different mechanical frequencies of a winding 110. The horizontal line at 0 dB represents a reference conventional (prior art) winding 110'. The dashed line represents a winding according to the present disclosure, having the first winding portion 116*a*, the second winding portion 116*b* and the third winding portion 116*c*, where the third winding portion 116*c* is provided with stiffer spacers than the first winding portion 116*a* and the second winding portion 116*b*. It can be seen that noise reduction is at least −3.5 dB at 100 Hz, which is a significant and noticeable reduction in noise.

The invention claimed is:

1. A winding for a phase winding of a transformer, said winding having coil turns around a coil axis, the winding having a first end and a second end and a winding center point on the coil axis between the first end and the second end, wherein the winding comprises a plurality of winding portions arranged along the coil axis said plurality of winding portions comprising a first winding portion arranged at the first end of the winding and a second winding portion arranged at the second end of the winding, the winding further comprising at least a third winding portion arranged along the coil axis between the first winding portion and the second winding portion, wherein the first winding portion and the second winding portion have a first winding portion stiffness as seen along said coil axis and the at least third winding portion has a second winding portion stiffness as seen along said coil axis, and wherein the second winding portion stiffness is greater than the first winding portion stiffness, and wherein the third portion has a third portion center point on the coil axis, equidistantly spaced at a distance from the first winding portion and from the second winding portion, which third portion center point is located closer to the first end of the winding than the winding center point.

2. The winding according to claim 1, wherein the winding is provided with a plurality of spacers between the coil turns, and wherein the first winding portion and the second winding portion are provided with at least one first type of spacers having at least one first modulus of elasticity and the third winding portion is provided with at least one second type of spacers having at least one second modulus of elasticity, and wherein each of the at least one second modulus of elasticity is greater than each of the at least one first modulus of elasticity.

3. The winding according to claim 1, wherein the third winding portion comprises a plurality of sub-portions arranged along the coil axis, each sub-portion having a sub-portion stiffness as seen along the coil axis, wherein each sub-portion comprises one second type of spacers and wherein each sub-portion stiffness is greater than the first winding portion stiffness.

4. The winding according to claim 3, wherein a distribution of the plurality of sub-portions forms an aggregate winding portion stiffness, and wherein the plurality of sub-portions is configured such that the aggregate winding portion stiffness of the third winding portion located on a first side of the winding center point as seen along the coil axis is greater than an aggregate winding portion stiffness of the third winding portion located on a second side of the winding center point as seen along the coil axis.

5. The winding according to claim 4, wherein the first side of the winding center point is located closer to the first end than to the second end of the winding.

6. The winding according to claim 2, wherein the modulus of elasticity of the first type of spacers is 0.1 GPa-3 GPa, and wherein the modulus of elasticity of the at least one second type of spacers is more than 50 GPa.

7. The winding according to claim 6, wherein a material of the first type of spacers is pressboard and wherein a material of the at least one second type of spacers is steatite.

8. The winding according to claim 1, wherein the first end is an upper end of the winding when installed in a transformer and the second end is a lower end of the winding when installed in a transformer.

9. The winding according to claim 1, wherein the first end is a lower end of the winding when installed in a transformer and the second end is an upper end of the winding when installed in a transformer.

10. A transformer comprising at least one winding according to claim 1.

11. The transformer according to claim 10, comprising at least one phase winding having the at least one winding.

12. A transformer arrangement comprising a transformer according to claim 10, the transformer being immersed in an electrically insulating medium inside a transformer tank.

* * * * *